United States Patent Office 3,545,184
Patented Dec. 8, 1970

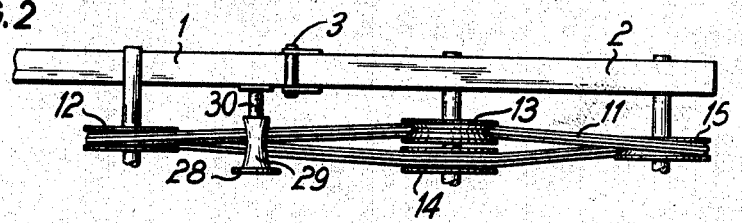
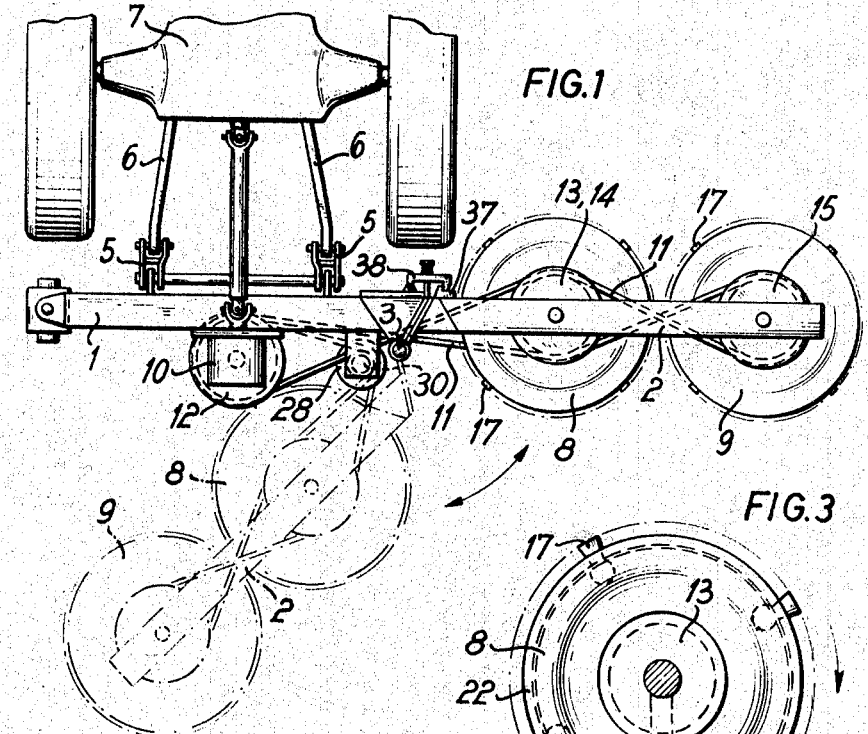
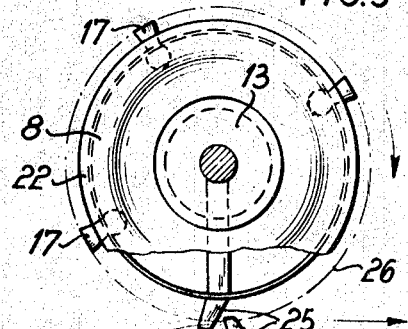
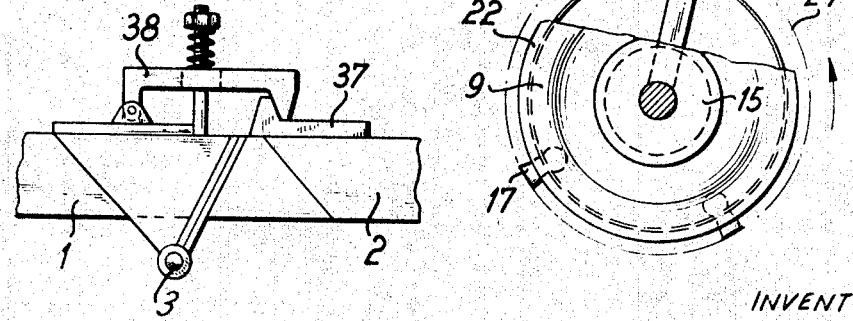
INVENTORS:
Adolf LIEPOLD
Karl-Heinz KUNTZE
BY: James E. Nilles
ATTORNEY

3,545,184
MECHANISM FOR MOWING OR HARVESTING VARIOUS CROPS
Adolf Liepold, Schwarzenbruck, near Nuremberg, and Karl-Heinz Kuntze, Feucht, near Nuremberg, Germany, assignors to Fella-Werke Gesellschaft mit beschrankter Haftung, Feucht, near Nuremberg, Germany, a corporation of Germany
Filed Aug. 15, 1968, Ser. No. 753,003
Claims priority, application Germany, Aug. 23, 1967, 1,582,220
Int. Cl. A01d 75/30, 35/26
U.S. Cl. 56—6                             4 Claims

ABSTRACT OF THE DISCLOSURE

A mowing machine for attachment to a tractor and which has a two piece carrier bar, one piece being attached to the hitch of the tractor while the other piece extends to one side of the tractor and can be pivoted about a vertical axis relative to the first piece. On the second piece is mounted a pair of rotary cutting members having vertical axes and horizontally positioned pulleys having a crossed power driving belt provided for driving the rotary members from a mitre-gear arrangement attached to the power take-off shaft of the tractor. Both pieces of the carrier bar are held in alignment by a spring loaded locking device. The crossed belt arrangement, the pivot point between the two pieces, and the support for the belt are all arranged in proper relative position so as to permit operation of the various parts without binding or malfunction.

---

The invention relates to a mechanism for mowing or harvesting crops of various kinds. Such machines, generally called "rotary mowers" contain a number of mowing rotors rotatable on vertical axes in pairs in counter-rotation. These rotors are arranged on a carrier beam which is attached with its one end to the three-point hitch of a tractor.

It is desirable to make such machines as inexpensive and easily-serviced as possible. In already known forms of such a embodiment, the cutting circles of the cutting elements of the said rotary mowing units usually overlap each other. In order that contact between the cutting elements of adjacent mowing rotors during running, may be prevented, care must be taken that the said mowing rotors are synchronously driven, which requires driving means acting through gears or chain-drives. The comparatively high running speeds of such mowing rotors then as a rule necessitate the employment of very bulky and expensive transmission gears or chain-drive arrangements.

The object of the present invention is therefore to replace this expensive and cumbersome form of construction by a simpler construction.

The present invention is a mechanism for mowing or harvesting various crops comprising a carrier beam the one side whereof is adapted to be attached on the end of the three-point hitch of a tractor and on the other side whereof are attached two mowing rotors actuated in counter-rotation by driving means and carrying cutter elements for rotation with the rotors, the power transmission to the mowing rotors comprising one or two driving belts.

There may be used according to the invention one twice-crossed driving belt, once crossed between the horizontal driving pulley and the axle of the first rotor which is fitted with two superposed horizontal belt pulleys and further crossed between the axles of the first and the second rotor. The superposition of two belt pulleys on the same axle prevents contact between the two parts of the belt at the crossing points. By this arrangement of the twice-crossed belt, the one part of the belt is made to pass around the one pulley and the other part around the other pulley, whereby a sufficient spacing is obtained at the said crossing points.

A further object of the invention is to make the carrier beam in two parts whereof the outer part with the attached two mowing rotors is swingably arranged on a pivot pin with reference to the inner part carrying the driving pulley. Said pivot pin may be placed at least approximately vertically and said outer part of the carrier beam adapted to swing back is held in its working position in alignment to said inner part by a springloaded locking device. The ability of the outer part of the carrier beam to swing backwards protects the said beam with the attached mowing rotors from becoming damaged by contact with any obstacle during mowing. Preferably said vertical pivot pin is displaced with reference to the inner crossing point of the belt shortly to said driving pulley. To prevent the belt from running slack and falling off when the outer part of the carrier beam swings out backwards, a roller extending below the belt is placed at the back side of the inner part of the carrier beam in alignment with said pivot pin or shortly displaced thereto to the driving pulley, said roller is provided at its underside with a disc.

The simplified form of drive belt transmission no longer requires synchronous running of the adjacent mowing rotors. For this reason, the cutting circles of the cutting elements of adjacent mowing rotors no longer intersect or overlap and always leave a small gap between them. To prevent any individual grass stalks which may find themselves in this gap from being cut off, a further development of the invention proposes to attach stripping fingers in overlapping position to the rigid vertical axles in the center of the rotors, the front edges of said fingers, looking in the direction of forward motion, form an acute angle with said direction and allow the crop to run off backwards and thus constrain the standing stalks to come into cutting range of the rotating cutter elements.

Referring to the drawings:

FIG. 1 is a top view of a carrier beam equipped with two mowing rotors hitched to a tractor showing in full lines the working position whereas in the position shown in dotted lines the outer part of the carrier beam is swung out backwards;

FIG. 2 is a rear elevational view of the carrier beam, the pulleys and the belt, viewed at right angles to the direction of rotation;

FIG. 3 is an enlarged top view, with portions omitted and other portions broken away and in section of two mowing rotors with the stripping fingers projecting into the gap between the two cutting circles.

FIG. 4 is a fragmentary top view of the carrier beam with the locking device for retaining the two parts of said beam in working position.

Referring to the drawings and first to FIGS. 1 and 2 the rotary mower comprises a horizontal frame member or carrier beam consisting of two parts 1, 2. The left-hand part 1 viewed in the direction of motion, i.e. the inner frame component, is mounted by means of two movable links 5 hitched to the bottom links 6 of the three-point suspension of a tractor 7 and with the ordinary top link, not shown in the drawing, of the tractor power lift.

To get an adequate adaptability to the terrain the carrier beam is free to move up and down. For this purpose its connection with the bottom links of the three-point hitch of the tractor incorporates swing links allowing an up and down motion of the carrier beam within certain limits.

The right hand part 2, i.e. the outer frame component, is equipped with two rotor cylinders 8, 9, which must be actuated in counter-rotation and which are provided at their lower cylindrical edge with cutting elements 17 which rotate in working position together with the rotors.

The power transmission for driving the rotors 8, 9 in counter-rotation comprises a V belt 11 suitably of hexagonal cross-section. The power is taken from a mitre-gear in a housing 10. The bevel gears therein are driven by an intermediate shaft connected to the power take off shaft of the tractor. The V-belt 11 passes from a belt pulley 12 carried on the vertical shaft which mounts the bevel gears in the housing 10 and runs, crossed, to the twin pulleys 13, 14 on the axle of the first mowing rotor 8 and thence, crossed once more, to the belt pulley 15 on the axle of the second or outer rotor 9, in order then to return to the driving pulley 12 over the twin-pulleys 13, 14. The twin-pulleys 13, 14 are superposed, whereby a sufficient spacing is obtained at the said both crossing points.

The inner and outer frame components 1, 2 are joined by a hinge pin 3. In the embodiment of FIG. 1 this pivot pin 3 is placed at least approximately vertically at the rear side of the carrier beam thus enabling the outer part 2 of the carrier beam to swing backwards around the pin 3 and to protect the attached mowing rotors from becoming damaged by contact with any obstacle mowing. To hold the two parts of the carrier beam in working position, a locking device is attached at the front side of this beam consisting of a spring-loaded ratchet 38 fastened to the inner part 1 and ratchet-nose 37 fastened at the outer part 2, as shown in FIG. 4. In order not to have to vary the length of the belt when the carrier beam swings out backwards, the inner crossing point of the driving belt at least approximately coincides with the vertical axis of the pivot pin 3, but preferably said vertical pivot pin is disposed with reference to the inner crossing point of the belt slightly to the left thereof toward the driving pulley 12 which has the purpose to slacken the belt when the carrier beam swings out backwards so that the rotation of the rotors stops.

At the back side of the inner part of the carrier beam a roller 29 is mounted upon a dependent shaft 30 that is fixed to inner portion 1 adjacent the pivot pin 3 upon which the outer portion moves relative to the inner portion 1. Said roller is provided with a disc 28 at its underside to prevent the belt from falling off when the outer part of the carrier beam swings out backwards.

The convex lower edge of each rotor is provided with a plurality of cutting elements 17 which radially project. In view of the non-synchronous running of adjacent mowing rotors driven by belts said rotors are located in adequate distance from each other leaving a small gap between them, thus avoiding the cutting circles 26, 27 to intersect or overlap. In order to catch any individual grass stalks which may find themselves in this gap, the gap is spanned by stripping fingers 25 which are attached to the rigid vertical axles 19 in the center of both rotors in overlapping position. The front edges of said fingers, looking in the direction of forward motion form an acute angle with said direction and allow the cut crop to run off backwards and thus constrain the standing stalks within said gap to come into cutting range of the rotating cutting elements.

We claim:
1. A mechanism for a mowing machine comprising; a carrier bar, said bar having one end attachable to the links of a three point hitch of a tractor, the other end of said bar extending to one side of the tractor and normal to the direction of travel of said tractor, said other end being provided with at least a pair of cylindrical mowing rotors carrying cutter elements, said rotors each having a vertical axis, a horizontally positioned pulley mounted on the vertical axis of one rotor, a pair of superposed pulleys mounted on the other rotor, said rotors being rotatable in opposite directions, a crossed belt around said pulleys, a bevelled gear mechanism connectable to the power take off shaft of said tractor, another pulley connected to said bevelled gear mechanism, said belt also being trained around said another pulley for being driven thereby; said carrier bar being comprised of an inner part and an outer part, a vertical pin located at the rear side of said bar for pivotally connecting said parts together for swinging about a vertical axis, said inner part being located behind the tractor and connected to the links of said three point hitch, said outer part supporting said mowing rotors, a spring loaded locking device located at the front side of said bar and between said parts for detachably holding them together, a roller mounted on the rear side of said inner part, said belt being once crossed between the pulleys of said rotors and having an inner crossing point located between the said another pulley and said rotor having the pair of superposed pulleys, said crossing point also being located forwardly of said roller in respect to normal direction of tractor travel, said rotors being located apart a sufficient distance to provide a small gap between their cutting circles, and stripping fingers attached to the vertical axes of said rotors and in overlapping relationship to thereby span the said gap between said rotors.

2. The mechanism set forth in claim 1 wherein said roller is disposed with reference to the inner crossing point of the belt slightly sidewards thereof toward said another pulley.

3. The mechanism set forth in claim 1 wherein said roller is provided at its underside with a disc for guiding said belt.

4. The mechanism set forth in claim 1 wherein the front edges of said stripping fingers in the direction of rotation form an acute angle with said direction.

References Cited
UNITED STATES PATENTS

| | | | |
|---|---|---|---|
| 2,697,319 | 12/1954 | Porter | 56—25.4 |
| 2,791,081 | 5/1957 | Allen et al. | 56—25.4 |
| 3,389,539 | 6/1968 | Zweegers | 56—6 |
| 3,390,515 | 7/1968 | Schaible et al. | 56—25 |
| 3,391,522 | 7/1968 | Zweegers | 56—6 |
| 3,395,522 | 8/1968 | Zweegers | 56—295 |
| 3,443,369 | 5/1969 | Zweegers | 56—6 |

FOREIGN PATENTS

| | | | |
|---|---|---|---|
| 80,447 | 1/1956 | Denmark | 56—6 |

RUSSELL R. KINSEY, Primary Examiner

U.S. Cl. X.R.

56—25.4